United States Patent
Albrecht

(10) Patent No.: US 10,798,052 B2
(45) Date of Patent: Oct. 6, 2020

(54) SWITCH AND METHOD FOR PROVIDING A NAME SERVICE WITHIN AN INDUSTRIAL AUTOMATION SYSTEM BY DISTRIBUTING SUPPLEMENTED ROUTER ADVERTISEMENT MESSAGES

(71) Applicant: SIEMENS AKTIENGESELLSCHAFT, Munich (DE)

(72) Inventor: Harald Albrecht, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/647,943

(22) PCT Filed: Aug. 23, 2018

(86) PCT No.: PCT/EP2018/072814
§ 371 (c)(1),
(2) Date: Mar. 17, 2020

(87) PCT Pub. No.: WO2019/063217
PCT Pub. Date: Apr. 4, 2019

(65) Prior Publication Data
US 2020/0267115 A1  Aug. 20, 2020

(30) Foreign Application Priority Data
Sep. 29, 2017 (EP) .................................... 17194062

(51) Int. Cl.
*H04L 29/12* (2006.01)
(52) U.S. Cl.
CPC ...... *H04L 61/1511* (2013.01); *H04L 61/2015* (2013.01); *H04L 61/2092* (2013.01); *H04L 61/6059* (2013.01)

(58) Field of Classification Search
CPC ............. H04L 61/1511; H04L 61/6059; H04L 61/2092; H04L 61/2015
See application file for complete search history.

(56) References Cited

U.S. PATENT DOCUMENTS

| 6,438,595 B1* | 8/2002 | Blumenau | ............. | G06F 9/5083 |
| | | | | 709/226 |
| 7,395,393 B2* | 7/2008 | Shiraki | ............... | G06F 21/6227 |
| | | | | 710/36 |

(Continued)

FOREIGN PATENT DOCUMENTS

| EP | 2940926 | 11/2015 |
| EP | 2940972 | 11/2015 |

(Continued)

OTHER PUBLICATIONS

Jeong Sungkyunkwan University Spark Samsung Electronics L Beloeil Orange S Madanapalli NTT Data J: "IPv6 Router Advertisement Options for DNS Configuration; rfc8106.txt", IPV6 Router Advertisement Options for DNS Configuration; RFC8106.TXT, Internet Engineering Task Force, IETF; Standard, Internet Society (ISOC) 4, Rue Des Falaises CH-1205 Geneva, Switzerland, pp. 1-19, XP015117691, Mar. 2017.

(Continued)

*Primary Examiner* — Daniel C. Murray
(74) *Attorney, Agent, or Firm* — Cozen O'Connor

(57) ABSTRACT

Switch and method for providing a name service within an industrial automation system that includes a plurality of cells that each have a plurality of automation devices and a cell switch, wherein router notification messages received by the cell switches are forwarded to a distributor unit of the cell switch and the distributor unit adds information concerning a name service host associated the cell, where the cell switches propagate the router notification messages supplemented by the distributor units thereof to the automation (Continued)

devices in the respective cells thereof, and where name resolution queries from the automation devices are transferred to the name service server associated with the cell via a name service functional unit.

18 Claims, 2 Drawing Sheets

(56) References Cited

U.S. PATENT DOCUMENTS

| | | | | |
|---|---|---|---|---|
| 7,734,745 B2* | 6/2010 | Gloe | .............. | H04L 29/12066 709/223 |
| 7,752,024 B2* | 7/2010 | Ball | .............. | H04L 41/12 703/1 |
| 7,991,913 B2* | 8/2011 | Yan | .............. | H04L 12/2898 709/229 |
| 8,175,089 B2* | 5/2012 | Hall | .............. | H04L 29/12066 370/389 |
| 8,300,637 B1* | 10/2012 | Bennett, III | .............. | H04L 61/2015 370/389 |
| 9,100,353 B2* | 8/2015 | Huang | .............. | H04L 45/745 |
| 9,602,332 B2* | 3/2017 | Shirota | .............. | H04L 61/1505 |
| 9,641,483 B2* | 5/2017 | Albrecht | .............. | H04L 61/3015 |
| 9,712,486 B2* | 7/2017 | Johnson | .............. | H04W 4/70 |
| 10,069,789 B2* | 9/2018 | Albrecht | .............. | H04L 61/303 |
| 10,212,038 B2* | 2/2019 | Albrecht | .............. | H04L 67/12 |
| 10,298,380 B2* | 5/2019 | Kiessling | .............. | H04L 29/06884 |
| 10,298,724 B2* | 5/2019 | Albrecht | .............. | H04L 61/6068 |
| 10,341,173 B2* | 7/2019 | Albrecht | .............. | H04L 61/305 |
| 10,382,384 B2* | 8/2019 | Hoeme | .............. | H04L 61/10 |
| 10,637,724 B2* | 4/2020 | Johnson | .............. | H04L 67/141 |
| 2003/0046390 A1* | 3/2003 | Ball | .............. | H04L 41/12 709/224 |
| 2004/0083306 A1* | 4/2004 | Gloe | .............. | H04L 29/12066 709/245 |
| 2004/0233916 A1* | 11/2004 | Takeuchi | .............. | H04L 29/12915 370/395.54 |
| 2005/0163118 A1* | 7/2005 | Steindl | .............. | H04L 29/12254 370/389 |
| 2007/0076724 A1* | 4/2007 | Hall | .............. | H04L 67/16 370/395.52 |
| 2008/0310323 A1* | 12/2008 | Shirota | .............. | H04L 29/12301 370/254 |
| 2008/0320111 A1* | 12/2008 | Yan | .............. | H04L 29/12066 709/220 |
| 2009/0041058 A1* | 2/2009 | Ikeda | .............. | H04L 61/6059 370/475 |
| 2009/0180441 A1* | 7/2009 | Ikeda | .............. | H04W 36/0011 370/331 |
| 2011/0225284 A1* | 9/2011 | Savolainen | .............. | H04L 29/12066 709/223 |
| 2015/0066979 A1* | 3/2015 | Zhang | .............. | G06F 16/245 707/769 |
| 2015/0312096 A1* | 10/2015 | Albrecht | .............. | H04L 61/305 709/220 |
| 2015/0312213 A1* | 10/2015 | Albrecht | .............. | H04L 61/3015 709/245 |
| 2016/0036764 A1* | 2/2016 | Dong | .............. | H04L 61/3025 370/254 |
| 2016/0087933 A1* | 3/2016 | Johnson | .............. | H04W 12/0023 709/245 |
| 2016/0241511 A1* | 8/2016 | Albrecht | .............. | H04L 43/08 |
| 2016/0255175 A1* | 9/2016 | Albrecht | .............. | H04L 61/6059 709/245 |
| 2016/0330168 A1* | 11/2016 | Albrecht | .............. | H04L 67/12 |
| 2017/0063624 A1* | 3/2017 | Albrecht | .............. | H04L 67/12 |
| 2017/0272316 A1* | 9/2017 | Johnson | .............. | H04L 67/141 |
| 2018/0077109 A1* | 3/2018 | Hoeme | .............. | H04L 61/1511 |
| 2019/0104033 A1* | 4/2019 | Carey | .............. | H04L 41/046 |
| 2019/0149509 A1* | 5/2019 | Albrecht | .............. | H04L 61/1511 709/223 |
| 2019/0158353 A1* | 5/2019 | Johnson | .............. | H04L 67/34 |
| 2019/0334860 A1* | 10/2019 | Albrecht | .............. | H04L 61/3005 |

FOREIGN PATENT DOCUMENTS

| | | |
|---|---|---|
| EP | 2955904 | 12/2015 |
| EP | 3062490 | 8/2016 |
| EP | 3076636 | 10/2016 |
| EP | 3091714 | 11/2016 |

OTHER PUBLICATIONS

Singh Wbeebee Cisco Systems H et al: "Basic Requirements for IPv6 Customer Edge Routers; rfc7084.txt", Basic Requirements for IPV6 Customer Edge Routers; RFC7084.TXT, Internet Engineering Task Force, IETF; Standard, Internet Society (ISOC) 4, Rue Des Falaises CH—1205 Geneva, Switzerland, pp. 1-21, XP015094909, [found on Nov. 22, 2013]; paragraph [04.2], [04.3]; Nov. 2013.

PCT International Search Report dated Oct. 11, 2018 based on PCT/EP2018/072814 filed Aug. 23, 2018.

Written Opinion of the International Searching Authority dated Oct. 11, 2018 based on PCT/EP2018/072814 filed Aug. 23, 2018.

* cited by examiner

SWITCH AND METHOD FOR PROVIDING A NAME SERVICE WITHIN AN INDUSTRIAL AUTOMATION SYSTEM BY DISTRIBUTING SUPPLEMENTED ROUTER ADVERTISEMENT MESSAGES

CROSS-REFERENCE TO RELATED APPLICATIONS

This is a U.S. national stage of application No. PCT/EP2018/072814 filed Aug. 23, 2018. Priority is claimed on EP Application No. 17194062 filed Sep. 29, 2017, the content of which is incorporated herein by reference in its entirety.

BACKGROUND OF THE INVENTION

1. Field of the Invention

The invention relates industrial automation systems and, more particularly, to a switch and method for providing a name service within an industrial automation system.

2. Description of the Related Art

Industrial automation systems are used to monitor, control and regulate technical processes, in particular in the field of production, process and building automation, and make it possible to operate control devices, sensors, machines and industrial installations in a manner that is intended to be as autonomous as possible and independent of human interventions. On account of a constantly increasing importance of information technology for automation systems comprising numerous networked control or computer units, methods for reliably providing functions distributed across an automation system for providing monitoring, control and regulation functions are becoming increasingly important. A particular problem regularly results in industrial automation systems from message traffic with a comparatively large number of, but relatively short, messages, thus intensifying the above problems.

EP 2 940 926 B1 describes a method for configuring a communication device within an industrial automation system, in which a configuration unit of the communication device transmits a datagram containing a configuration request to a configuration server. The configuration server assigns at least one first topological device name component, which is assigned to spatial or hierarchical arrangement of the configuration server, to the communication device in response to the configuration request. Each forwarding distributor unit adds a further topological device name component that is assigned to a spatial or hierarchical arrangement of the respective forwarding distributor unit. The configuration unit of the communication device uses the topological device name components and a name component that is unique within its subnetwork to generate its device name.

EP 2 940 972 B1 discloses a method for providing a name service within an industrial communication system, in which IPv6 prefixes are distributed in respective subordinate subnetworks by routers via messages containing router advertisements. Here, the router advertisements comprise a topological or hierarchical name component of the respective router that is assigned to a spatial or hierarchical arrangement of the respective router. Router advertisements containing name information from superordinate subnetworks are received by routers assigned to subordinate subnetworks and are supplemented with a topological or hierarchical name component assigned to the respective router and are distributed within the respective subordinate subnetwork. Communication terminals independently generate their device name from topological or hierarchical name components and a name component that is unique within their respective subnetwork.

EP 2 955 904 B1 relates to a method for allocating communication network addresses for network subscribers of a segmented network having a plurality of subnetworks. The subnetworks are each connected to a collection network connecting them via a subnetwork router. Here, a common address range is determined in a decentralized manner by the subnetwork routers by interchanging router messages distributed over the collection network, and communication network addresses for the network subscribers are stipulated within the address range.

EP 3 062 490 A1 discloses the fact that, in order to transmit data within an industrial automation system comprising at least one subnetwork with a group of communication devices and a subnetwork control device, a name or configuration service component assigned to the subnetwork control device captures IPv4 addresses and associated device names for the group of communication devices. An IPv6 address is respectively calculated for the group of communication devices from an IPv6 prefix assigned to the subnetwork and the IPv4 addresses of the communication devices. The IPv4 addresses of the communication devices and the calculated IPv6 addresses are used to determine address translation rules that are used by an address translation unit assigned to the subnetwork control device for address translation between IPv4 addresses and IPv6 addresses. The calculated IPv6 addresses and the associated device names are stored in a superordinate name service server.

EP 3 076 636 B1 describes the fact that, in order to provide a name service, a name service server of an industrial automation system transmits messages containing router advertisements that comprise information relating to an IPv6 address of the name service server. Communication terminals use IPv6 prefixes distributed via router advertisements within their respective subnetwork to independently generate their IPv6 address. In addition, communication terminals use topological or hierarchical name components and a name component that is unique within their respective subnetwork to independently generate their device name. Communication devices each comprise a name service client for dynamic Domain Name System (DNS), via which storage of an IPv6 address and an associated device name of the respective communication device in the name service server is requested based on the IPv6 address of the name service server.

In order to provide a name service within an industrial automation system, according to EP 3 091 714 A1, communication devices of the industrial automation system each check, via a name service component, whether a device name having a topological or hierarchical name component, which substantially completely describes a spatial or hierarchical arrangement of the respective communication device, is assigned to the respective communication device. In the event of a positive checking result, the communication devices each treat their assigned device name as a complete device name. In the event of a negative checking result, the communication devices each independently generate their complete device name from topological or hierarchical name components distributed via messages containing router advertisements and a name component which is unique within their respective subnetwork.

In many applications, corporate or office communication networks (IT networks) are administered separately from communication networks of industrial automation systems. It is problematic in this case if automation cells are connected via routers that are assigned to a corporate or office communication network and are administered accordingly, and separate Domain Name System (DNS) servers are simultaneously desired for the automation cells. In the context of IPv6 (Internet Protocol Version 6), this complicates independent configuration of the DNS servers of the automation cells. In particular, automation cells are often intended to be operated as standard data link layer broadcast domains and IPv6 router advertisements containing information relating to DNS servers are intended to be distributed to all communication or automation devices in such a broadcast domain. However, for this purpose, it is fundamentally necessary for the address and namespace of a DNS server of an automation cell to be known for a superordinate router. In principle, problems resulting from this can be solved either via a manual balancing between router administration and automation cell administration or by using in each case an additional, mostly unnecessary router for each automation cell.

SUMMARY OF THE INVENTION

It is an object of the present invention to provide a method for efficiently providing a name service, which can be configured easily and with few errors, within an industrial automation system and to provide a suitable apparatus for performing the method.

This and other objects and advantages are achieved in accordance with the invention, by a method for providing a name service within an industrial automation system, where the industrial automation system comprises a plurality of cells each having a plurality of automation devices and a cell switch that connects the automation devices within its cell to one another automation device at least indirectly. In this case, the cell switches can each connect the automation devices within their cell to one another directly or via further switches. The cell switches are connected to an assigned router that distributes IPv6 prefixes into subordinate subnetworks via router advertisement messages, in particular router advertisements according to Internet Engineering Task Force (IETF) Request for Comments (RFC) 4861. The cell switches are each preferably communication devices separated from the assigned router. The cell switches and/or the automation devices independently determine their respective IPv6 address using the IPv6 prefixes contained in router advertisement messages.

In accordance with the invention, router advertisement messages from the assigned router, which are received by the cell switches, are forwarded to a distributor unit, in particular a router advertisement relay, of the respective cell switch and are supplemented, by the distributor unit, with information relating to a name service server assigned to the respective cell. The cell switches each preferably comprise the name service server assigned to their cell. Here, the cell switches advantageously each comprise a functional unit for processing an IPv6 communication protocol stack, to which functional unit the respective name service server is coupled.

In accordance with the invention, the cell switches distribute the router advertisement messages, supplemented by their distributor units, to the automation devices in their respective cell, where the cells are preferably each operated as a standard data link layer broadcast domain. In particular, the information relating to the name service server assigned to the respective cell can be distributed in this case by means of a recursive DNS server option in accordance with IETF RFC 8106. Information contained in received router advertisement messages and relating to the name service server assigned to the respective cell is forwarded to a name service functional unit of the respective automation device by the automation devices and is used by the name service functional unit for its configuration. The name service functional unit may be a Domain Name System (DNS) client, for example. Name resolution queries from the automation devices will be transmitted, via the respective name service functional unit, according to the configuration thereof, to the assigned name service server. A cell switch can be in the form of a device independent of the assigned IPv6 router. Consequently, the method in accordance with the invention results in highly simplified administration if the operation of the automation network and the superordinate IPv6 router and/or the corporate or office communication network falls in different areas of responsibility. In addition, the cell switches can be independently configured in a manner consistent with the superordinate IPv6 router using existing standard IPv6 methods.

In accordance with one advantageous embodiment of the method in accordance with the invention, the router advertisement messages from the assigned router, which are received by the cell switches, comprise information relating to a name service server superordinate to the respective cell. Here, the information relating to the superordinate name service server is respectively used to configure the name service server assigned to the respective cell. Accordingly, the name resolution queries from the automation devices, depending on a respectively specified domain name suffix, are either handled by the name service server of the respective cell or are forwarded thereby to the superordinate name service server for name resolution purposes. Name resolution queries containing domain name suffixes not assigned to the respective cell can therefore be delegated to the superordinate name service server.

The router advertisement messages from the assigned router, which are received by the cell switches, preferably comprise a domain name suffix assigned to this router and are supplemented, by the distributor units, in each case with information relating to a name assigned to the respective cell. Here, the cell switches distribute the domain name suffixes, supplemented by their distributor units, via the router advertisement messages for the automation devices of their respective cell. The domain name suffixes are advantageously distributed by means of a DNS search list option in accordance with IETF RFC 8106.

In accordance with another advantageous embodiment of the present invention, the automation devices each forward domain name suffixes contained in received router advertisement messages to their name service functional unit. The domain name suffixes are each used by the name service functional units for their name service configuration. The name service functional units each generate a completely qualified domain name for the respective automation device from the respective domain name suffix and a host name of the respective automation device. The automation devices each, via their name service functional unit, preferably request storage of their communication network address and of their completely qualified domain name in the name service server assigned to their cell. In addition, the domain name suffixes supplemented by the distributor units of the cell switches are advantageously each used to configure the name service server assigned to the respective cell.

The switch in accordance with the invention for a cell of an industrial automation system comprises a plurality of communication connections for connection to automation devices contained in the cell and for connection to a router. The switch also comprises a plurality of transmission and reception units each assigned to a communication connection. The switch additionally has a coupling element that can be used to connect the transmission and reception units to one another in a switchable manner. The coupling element may be, for example, a backplane switch having an assigned controller. In addition, the switch comprises a distributor unit for router advertisement messages.

In accordance with the invention, the switch is configured to determine its IPv6 address based on an IPv6 prefix contained in a received router advertisement message and to forward received router advertisement messages to the distributor unit. The distributor unit is configured to supplement received router advertisement messages with information relating to a name service server assigned to the cell. In this case, the switch is configured to distribute the router advertisement messages, supplemented by the distributor unit, to the automation devices in the cell and to transmit name resolution queries from the automation devices contained in the cell to the name service server assigned to the cell.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment on the basis of the drawing, in which.

DETAILED DESCRIPTION OF THE EXEMPLARY EMBODIMENTS

Figure 1:
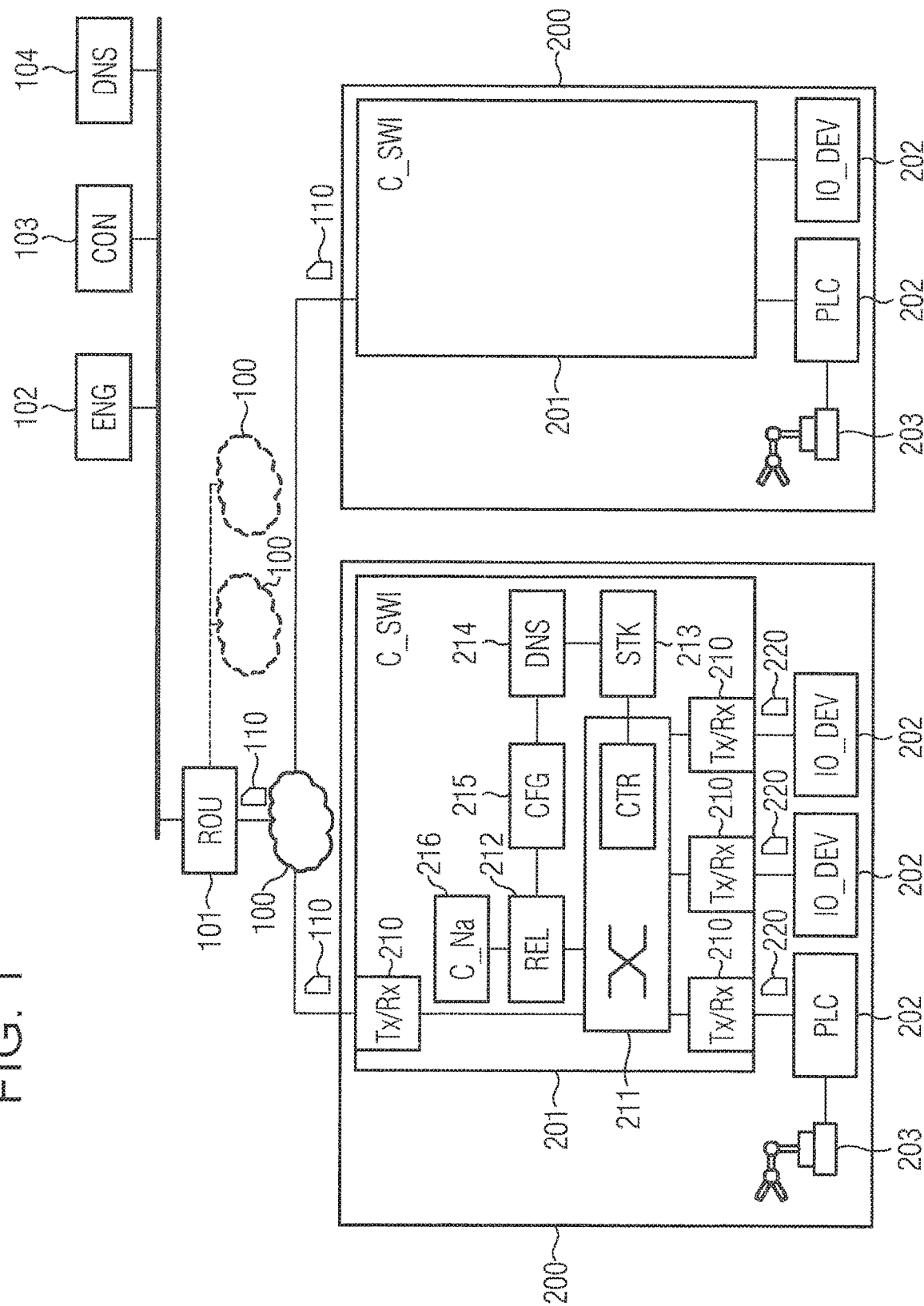
FIG. 1 shows an industrial automation system in accordance with the invention that comprises a plurality of cells and that has an engineering system, a control system and a superordinate DNS server.

The industrial automation system illustrated in FIG. 1 comprises an engineering system 102 for planning automation devices, a control system 103 for monitoring the automation devices, a superordinate DNS server 104 and a plurality of identical cells 200 each having a plurality of automation devices 202. The cells 200 each additionally comprise a cell switch 201, to which the automation devices 202 of the respective cell 200 are connected. In principle, the cells 200 can each comprise additional switches for connecting automation devices that are connected to the respective cell switch 201 via these additional switches. In the present exemplary embodiment, the cells 200 are each operated as a standard data link layer broadcast domain.

The engineering system 102, the control system 103 and the superordinate DNS server 104 are connected to a plurality of subnetworks 100 via a router 101 with IPv6 capability, in particular to an industrial communication network, to which the cells 200 are each connected via their cell switch 201. Here, the cell switches 201 are each separate communication devices and are advantageously administered separately from the router 101. The router 101 distributes IPv6 prefixes managed by it into subordinate subnetworks 100 via router advertisement messages 110.

The automation devices 202 may be, for example, programmable logic controllers, input/output units (I/O modules) or operating and observation stations. Programmable logic controllers typically each comprise a communication module, a central unit and at least one input/output unit. Input/output units can fundamentally also be formed as decentralized peripheral modules that are arranged in a manner remote from a programmable logic controller.

A programmable logic controller can be connected, for example, to the respective cell switch 201 or to a field bus via the communication module. The input/output unit is used to interchange control and measurement variables between the programmable logic controller and a machine or apparatus 203 controlled by the programmable logic controller. The central unit is provided, in particular, for the purpose of determining suitable control variables from captured measurement variables. The above components of the programmable logic controller are preferably connected to one another via a backplane bus system.

An operating and observation station 302 is used to visualize process data or measurement and control variables that are processed or captured by programmable logic controllers, input/output units or sensors. In particular, an operating and observation station is used to display values of a control loop and to change control parameters. Operating and observation stations comprise at least one graphical user interface, an input device, a processor unit and a communication module.

The cell switches 201 each comprise a plurality of communication connections for connection to the automation devices 202 contained in the respective cell 200 and for connection to the router 101. A transmission and reception unit 210 implemented via a PHY and MAC functional unit is respectively assigned to the communication connections. The cell switches 201 also each comprise a functional unit 213 for processing an IPv6 communication protocol stack, which functional unit accesses the transmission and reception units 210 via drivers. The cell switches 201 also each have a coupling element 211 that can be used to connect the transmission and reception units 210 to one another in a switchable manner. In the present exemplary embodiment, the coupling element 211 is implemented via a backplane switch having an assigned controller.

Each cell switch 201 is configured, in particular via configuration, to determine its IPv6 address on the basis of an IPv6 prefix contained in a received router advertisement message 110 and to forward received router advertisement messages to a distributor unit 212 that is connected to the coupling element 211. In the present exemplary embodiment, the router advertisement messages are router advertisements in accordance with IETF RFC 4861, while the distributor units 212 of the cell switches 201 are router advertisement relays.

Router advertisement messages 110 from the router 101, which have been received by the cell switches 201, are supplemented, after they have been forwarded to the distributor unit 212, with information relating to a name service server 214 assigned to the respective cell 200 by the distributor unit 212. In the present exemplary embodiment, the name service servers 214 assigned to the cells 200 are each integrated in the cell switches 201. Here, the name service servers 214 are each coupled to the functional unit 212 for processing the IPv6 communication protocol stack. In this manner, the information relating to the name service server 214, i.e., the IPv6 address of the respective cell switch 201, can be easily provided by the functional unit 212 for processing the IPv6 communication protocol stack.

The cell switches 201 distribute the router advertisement messages 220, supplemented by their distributor units 212, to the automation devices 202 in their respective cell 200, preferably via a recursive DNS server option in accordance with IETF RFC 8106. Information contained in received supplemented router advertisement messages 220 and relating to the name service server 214 assigned to the respective cell 200 is forwarded to a name service functional unit by the automation devices 202. The name service functional unit is, in particular, a DNS client of the respective automation device 202, which uses the information relating to the name service server 214 assigned to the respective cell 200 for its own configuration. Name resolution queries from the automation devices 202 are accordingly transmitted, via the respective name service functional unit, according to the configuration thereof, to the assigned name service server 214. In addition, in the present exemplary embodiment, the automation devices 202 also independently determine their respective IPv6 address based on the IPv6 prefixes contained in supplemented router advertisement messages 220.

The router advertisement messages 110 from the router 101, which are received by the cell switches 201, additionally comprise a domain name suffix assigned to the router 101. Accordingly, the router advertisement messages 110 are each supplemented, by the distributor units 212, with information relating to a name that is assigned to the respective cell 200 and is read, for example, from a storage unit 216 containing configuration data relating to the respective cell switch 201. The cell switches 201 then distribute the domain name suffixes supplemented by their distributor units 212 via the router advertisement messages 220 for the automation devices 202 of their respective cell 200. Here, the domain name suffixes are preferably distributed via a DNS search list option in accordance with IETF RFC 8106. The domain name suffixes supplemented by the distributor units 212 of the cell switches 201 are each also made available to a DNS configuration unit 215 of the name service server 214 assigned to the respective cell 200 and are used for the configuration thereof.

In the present exemplary embodiment, the router advertisement messages 110 from the router 101, which are received by the cell switches 201, also comprise information relating to the superordinate DNS server 104, which information is likewise used to configure the name service server 214 assigned to the respective cell 200. Accordingly, the name resolution queries from the automation devices 202, depending on a respectively specified domain name suffix, are either handled by the name service server 214 of the respective cell 200 or are forwarded to the superordinate DNS server 104 for name resolution purposes. Name resolution queries containing domain name suffixes not assigned to the respective cell 200 are preferably delegated to the superordinate DNS server 104 by the name service server 214 of the respective cell 200.

The automation devices 202 forward domain name suffixes contained in received router advertisement messages 220 to their name service functional unit in each case. The domain name suffixes are then each used by the name service functional units for their name service configuration. Based on this, the name service functional units each generate a completely qualified domain name for the respective automation device from the respective domain name suffix and a host name of the respective automation device 202. In the present exemplary embodiment, the automation devices 202 each, via their name service functional unit, request storage of their communication network address and their completely qualified domain name in the name service server 214 assigned to their cell 200. In the respective name service server 214, the automation devices 202 are registered within a DNS zone configured for the name service server 214. Here, the respectively configured DNS zone results, for example, from the domain name suffix assigned to the router 101 and from the name of the respective cell 200. The automation devices 202 are each registered within the above-mentioned DNS zone, preferably by means of a DNS update in accordance with IETF RFC 2136.

Figure 2:
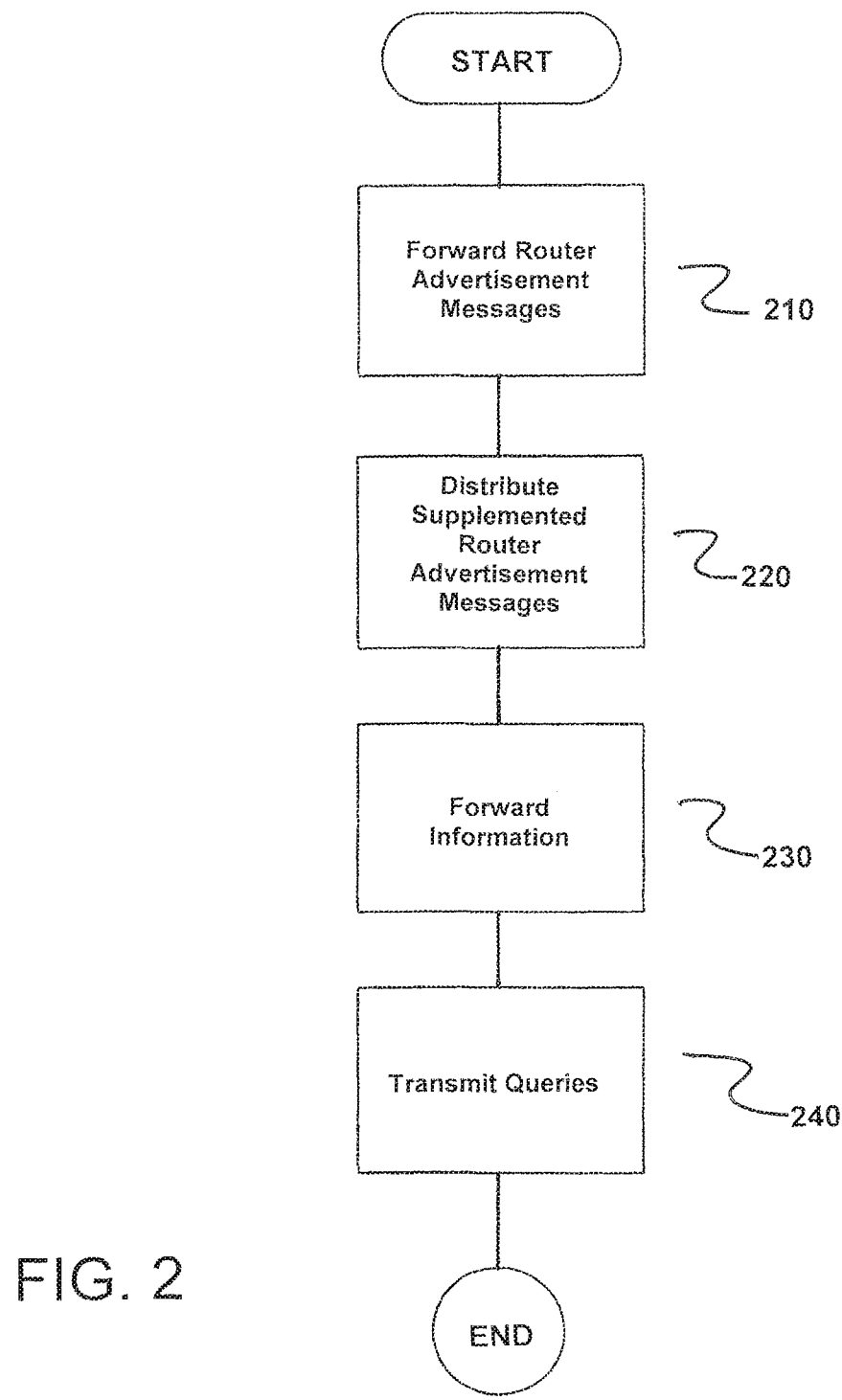
FIG. 2 is a flowchart of the method in accordance with the invention.

FIG. 2 is a flowchart of a method for providing a name service within an industrial automation system including a plurality of cells 200 which each have a plurality of automation devices 202 and a cell switch 201 that connects the plurality of automation devices within its cell to one another at least indirectly, where cell switches 201 are connected to an assigned router 101 that broadcasts IPv6 prefixes into subordinate subnetworks 110 via router advertisement messages 110, and where at least one of the cell switches 201 and the plurality of automation devices 202 determine their respective IPv6 address utilizing the IPv6 prefixes contained in the router advertisement messages 110, 220.

The method comprises forwarding router advertisement messages 110 from the assigned router 10, which are received by the cell switches 201, to a distributor unit 212 of the respective cell switch 201 and supplementing, by the distributor unit 212, the received router advertisement messages 110 with information relating to a name service server 214 assigned to the respective cell 200, as indicated in step 210.

Next, the router advertisement messages 220, supplemented by their distributor units 212, are distributed by the cell switches 201 to the automation devices 202 in their respective cell 200, as indicated in step 220.

Next, information contained in received router advertisement messages 220 and relating to the name service server 214 assigned to the respective cell 200 is forwarded to a name service functional unit of the respective automation device by the automation devices 202 and the forwarded information contained in received router advertisement messages (220) is utilized by the name service functional unit for its configuration, as indicated in step 230.

Next, name resolution queries are transmitted from the automation devices 202, via a respective name service functional unit, in accordance with a configuration thereof, to an assigned name service server 214, as indicated in step 240.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing a name service within an industrial automation system including a plurality of cells which each have a plurality of automation devices and a cell switch which connects the plurality of automation devices within its cell to one another at least indirectly, cell switches being connected to an assigned router which broadcasts IPv6 prefixes into subordinate subnetworks via router advertisement messages, at least one of the cell switches and the plurality of automation devices determining their respective IPv6 address utilizing the IPv6 prefixes contained in the router advertisement messages, the method comprising:

forwarding router advertisement messages from the assigned router, which are received by the cell switches, to a distributor unit of the respective cell switch and supplementing, by the distributor unit, the received router advertisement messages with information relating to a name service server assigned to the respective cell;

distributing, by the cell switches distribute, the router advertisement messages, supplemented by their distributor units, to the automation devices in their respective cell;

forwarding information contained in received router advertisement messages and relating to the name service server assigned to the respective cell to a name service functional unit of the respective automation device by the automation devices and utilizing said forwarded information contained in received router advertisement messages by the name service functional unit for its configuration; and transmitting name resolution queries from the automation devices, via a respective name service functional unit, in accordance with a configuration thereof, to an assigned name service server.

2. The method as claimed in claim 1, wherein the router advertisement messages from the assigned router, which are received by the cell switches, comprise a domain name suffix assigned to this router and are each supplemented, by the distributor units, with information relating to a name assigned to a respective cell; and wherein the cell switches distribute domain name suffixes, supplemented by their distributor units, via the router advertisement messages for the automation devices of their respective cell.

3. The method as claimed in claim 2, wherein the automation devices forward domain name suffixes contained in each received router advertisement messages to their name service functional unit;

wherein the domain name suffixes are each used by the name service functional units for their name service configuration; and wherein the name service functional units each generate a completely qualified domain name for the respective automation device from the respective domain name suffix and a host name of the respective automation device.

4. The method as claimed in claim 3, wherein the automation devices each, via their name service functional unit, request storage of their communication network address and of their completely qualified domain name in the name service server assigned to their cell.

5. The method as claimed in claim 4, wherein the domain name suffixes, supplemented by the distributor units of the cell switches, are each utilized to configure the name service server assigned to the respective cell.

6. The method as claimed in claim 3, wherein the domain name suffixes, supplemented by the distributor units of the cell switches, are each utilized to configure the name service server assigned to the respective cell.

7. The method as claimed in claim 2, wherein the domain name suffixes, supplemented by the distributor units of the cell switches, are each utilized to configure the name service server assigned to the respective cell.

8. The method as claimed in claim 2, wherein the domain name suffixes are distributed via a Domain Name System (DNS) search list option in accordance with Internet Engineering Task Force (IETF) Request for Comments (RFC) 8106.

9. The method as claimed in claim 1, wherein the information relating to the name service server assigned to the respective cell is distributed via a recursive Domain Name System (DNS) server option in accordance with Internet Engineering Task Force (IETF) Request for Comments (RFC) 8106.

10. The method as claimed in claim 1, wherein the cell switches are each communication devices separated by the assigned router.

11. The method as claimed in claim 1, wherein the cell switches each connect the automation devices within their cell to one another one of (i) directly or (ii) via further switches.

12. The method as claimed in claim 1, wherein the cell switches each comprise the name service server assigned to their cell.

13. The method as claimed in claim 12, wherein the cell switches each comprise a functional unit for processing an IPv6 communication protocol stack, to which the respective name service server is coupled.

14. The method as claimed in claim 1, wherein the router advertisement messages from the assigned router, which are received by the cell switches, comprise information relating to a superordinate name service server superordinate to the respective cell;

wherein the information relating to a superordinate name service server is utilized to configure each name service server assigned to the respective cell; and wherein the name resolution queries from the automation devices, depending on a respectively specified domain name suffix, are one of (i) handled by the name service server of the respective cell or (ii) forwarded by the name service server to the superordinate name service server for name resolution purposes.

15. The method as claimed in claim 1, wherein the cells are each operated as a standard data link layer broadcast domain.

16. The method as claimed in claim 1, wherein the router advertisement messages are router advertisements in accordance with Internet Engineering Task Force (IETF) Request for Comments (RFC) 4861; and wherein the distributor units of the cell switches are router advertisement relays.

17. A switch for a cell of an industrial automation system, comprising:

a plurality of communication connections for connection to automation devices contained in the cell and for connection to a router;

a plurality of transmission and reception units each assigned to a communication connection;

a coupling element which is utilized to connect the transmission and reception units to one another in a switchable manner;

a distributor unit for router advertisement messages;

wherein the switch is configured to determine its IPv6 address based on an IPv6 prefix contained in a received router advertisement message and to forward received router advertisement messages to the distributor unit;

wherein the distributor unit is configured to supplement received router advertisement messages with information relating to a name service server assigned to the cell; and wherein the switch is configured to distribute the router advertisement messages, supplemented by the distributor unit, to the automation devices in the cell and configured to transmit name resolution queries from the automation devices contained in the cell to the name service server assigned to the cell.

18. The switch as claimed in claim 17, wherein the coupling element comprises a backplane switch having an assigned controller.

* * * * *